UNITED STATES PATENT OFFICE.

HOLBROOK GASKELL, JR., OF WIDNES, ENGLAND.

IMPROVEMENT IN PROCESSES OF MANUFACTURING CAUSTIC SODA.

Specification forming part of Letters Patent No. 169,800, dated November 9, 1875; application filed October 20, 1875.

*To all whom it may concern:*

Be it known that I, HOLBROOK GASKELL, the younger, of Widnes, in the county of Lancaster, England, alkali-manufacturer, have invented Improvements in the Manufacture of Alkali, of which the following is a specification:

This invention relates to that stage in the manufacture of alkali in which black ash is produced in revolving furnaces.

At present either the whole charge, consisting of salt cake, slack or small coal, and limestone or chalk, is placed in the furnace at once—that is to say, simultaneously—or the limestone or chalk, with or without slack or small coal, is first placed in the furnace, and, when hot, the salt cake and the remainder of the requisite charge of slack or small coal are added; or the salt cake, together with an equivalent, or thereabout, of limestone or chalk, and the requisite proportion of slack or small coal, are put into the furnace, and when the reaction is nearly complete a small quantity of caustic lime is added.

Now, my invention consists in first charging the revolving furnace either with salt cake and a portion or the whole of the slack or small coal requisite, or with salt cake alone, and when the salt cake has fluxed, or softened and shrunk, so that it occupies less space in the furnace, I add the remainder of the charge—viz., the requisite amount of chalk, limestone or lime, and slack or small coal, if the whole of the slack or small coal has not been put in at first. If the chalk, limestone, lime, or slack or small coal added and operated upon contain a material amount of moisture, I prefer that they be added as soon as there is sufficient space for the same, without waiting until the salt cake is thoroughly fluxed, as their addition after the salt cake has been fused, or has become fluid, might cause an explosion. The charge having been sufficiently operated upon in the revolving furnace, and the desired result having been obtained, the charge is withdrawn, as is well understood.

I claim—

The process of manufacturing what is known as black ash, in revolving furnaces, by first charging a heated revolving furnace with salt cake, or with salt cake and slack or small coal, and when the salt cake has become fluxed, or has softened and shrunk, adding thereto the chalk, lime or limestone, and the remaining portion of slack or small coal, if any, substantially as hereinbefore described.

In witness whereof, I the said HOLBROOK GASKELL, the younger, have hereunto signed my name to this specification in the presence of two subscribing witnesses.

HOLBROOK GASKELL, JR.

Witnesses:
 EUSTACE CAREY, *of Widnes.*
 ALEXANDER WALKER, *of Widnes.*